US010776520B2

(12) United States Patent
Chen et al.

(10) Patent No.: US 10,776,520 B2
(45) Date of Patent: Sep. 15, 2020

(54) SYSTEM AND METHOD FOR PROXY-BASED DATA ACCESS MECHANISM IN ENTERPRISE MOBILITY MANAGEMENT

(71) Applicant: Northwestern University, Evanston, IL (US)

(72) Inventors: Yan Chen, Northfield, IL (US); Zhengyang Qu, Evanston, IL (US); Vaibhav Rastogi, Evanston, IL (US)

(73) Assignee: Northwestern University, Evanston, IL (US)

( * ) Notice: Subject to any disclaimer, the term of this patent is extended or adjusted under 35 U.S.C. 154(b) by 526 days.

(21) Appl. No.: 15/264,944

(22) Filed: Sep. 14, 2016

(65) Prior Publication Data

US 2017/0076103 A1 Mar. 16, 2017

Related U.S. Application Data

(60) Provisional application No. 62/218,072, filed on Sep. 14, 2015.

(51) Int. Cl.
*G06F 21/62* (2013.01)
(52) U.S. Cl.
CPC ........ *G06F 21/629* (2013.01); *G06F 21/6218* (2013.01)
(58) Field of Classification Search
CPC . G06F 21/629; G06F 21/6218; G06F 21/6245
See application file for complete search history.

(56) References Cited

U.S. PATENT DOCUMENTS

| | | | | |
|---|---|---|---|---|
| 6,158,010 A * | 12/2000 | Moriconi | ............... | G06F 21/552 709/223 |
| 6,233,576 B1 * | 5/2001 | Lewis | ...................... | G06F 9/468 |
| 7,093,286 B1 * | 8/2006 | King | ................... | H04L 63/0281 380/270 |
| 7,168,003 B2 * | 1/2007 | Lozano | ................. | G06F 9/4411 702/108 |
| 7,257,833 B1 * | 8/2007 | Parekh | ................ | H04L 63/0227 726/1 |
| 7,448,067 B2 * | 11/2008 | Yadav | ................. | H04L 63/0227 709/223 |
| 7,478,420 B2 * | 1/2009 | Wright | .................... | G06F 21/32 379/15.03 |
| 8,176,562 B1 * | 5/2012 | Hernacki | ............ | G06F 21/6218 709/223 |

(Continued)

OTHER PUBLICATIONS

Jona.t4, "Hooking explained: detouring library calls and Vtable patching in Windows/Linux/MAC-OSX", Woensdag 27, Nov. 2013. (Year: 2013).*

(Continued)

*Primary Examiner* — Tongoc Tran
(74) *Attorney, Agent, or Firm* — Benesch, Friedlander, Coplan & Aronoff LLP

(57) ABSTRACT

A system and method include a shield application executing on a processor. The shield application can convert a business application to provide data isolation between the business application and personal applications, and data sharing between the business application and other business applications, e.g., in the bring-your-own-device and enterprise mobility management scenarios.

18 Claims, 9 Drawing Sheets

(56) References Cited

U.S. PATENT DOCUMENTS

| | | | | |
|---|---|---|---|---|
| 8,978,106 B2* | 3/2015 | Swamy | G06F 17/00 | 705/27.1 |
| 9,197,668 B2* | 11/2015 | Boucher | G06F 21/6218 | |
| 2001/0021926 A1* | 9/2001 | Schneck | G06F 21/10 | 705/54 |
| 2003/0050063 A1* | 3/2003 | Faerber | H04W 36/30 | 455/437 |
| 2003/0054810 A1* | 3/2003 | Chen | H04L 29/06 | 455/422.1 |
| 2003/0081621 A1* | 5/2003 | Godfrey | H04L 29/06 | 370/400 |
| 2003/0177389 A1* | 9/2003 | Albert | H04L 12/2856 | 726/1 |
| 2004/0003285 A1* | 1/2004 | Whelan | H04L 63/1408 | 726/23 |
| 2004/0025162 A1* | 2/2004 | Fisk | G06F 3/0613 | 718/105 |
| 2004/0064727 A1* | 4/2004 | Yadav | H04L 63/0227 | 726/1 |
| 2004/0075677 A1* | 4/2004 | Loyall | G06F 3/011 | 715/706 |
| 2006/0147043 A1* | 7/2006 | Mann | H04L 41/0893 | 380/270 |
| 2006/0174078 A1* | 8/2006 | Robison | G06F 9/468 | 711/163 |
| 2006/0234678 A1* | 10/2006 | Juitt | H04L 1/22 | 455/411 |
| 2006/0242685 A1* | 10/2006 | Heard | G06F 21/577 | 726/3 |
| 2007/0143839 A1* | 6/2007 | Chen | G06F 21/53 | 726/17 |
| 2009/0037976 A1* | 2/2009 | Teo | G06F 21/566 | 726/1 |
| 2010/0027551 A1* | 2/2010 | Arkin | H04L 29/12028 | 370/400 |
| 2011/0173495 A1* | 7/2011 | Qian | H04L 1/1848 | 714/18 |
| 2015/0121076 A1* | 4/2015 | Wante | H04L 61/2528 | 713/171 |
| 2015/0135317 A1* | 5/2015 | Tock | G06F 21/56 | 726/23 |
| 2015/0296505 A1* | 10/2015 | Luna | H04W 4/18 | 370/329 |
| 2016/0006758 A1* | 1/2016 | Holt | H04L 63/1466 | 726/23 |
| 2016/0149958 A1* | 5/2016 | Singh | H04L 63/205 | 726/1 |
| 2016/0261750 A1* | 9/2016 | Tubi | H04M 15/39 | |
| 2016/0267286 A1* | 9/2016 | Kodeswaran | G06F 21/6263 | |
| 2018/0101422 A1* | 4/2018 | Flanigan | G06F 9/546 | |
| 2019/0288982 A1* | 9/2019 | Li | H04L 61/2046 | |

OTHER PUBLICATIONS

J. Andrus, C. Dall, A. Hof, O. Laadan, and J. Nieh. Cells: a virtual mobile smartphone architecture. In Proceedings of the Twenty-Third ACM Symposium on Operating Systems Principles, pp. 173-187. ACM, 2011.

M. Lange, S. Liebergeld, A. Lackorzynski, A. Warg, and M. Peter. L4android: a generic operating system framework for secure smartphones. In Proceedings of the 1st ACM workshop on Security and privacy in smartphones and mobile devices, pp. 39-50. ACM, 2011.

Z. Zhao and F. C. C. Osono. trustdroid: Preventing the use of smartphones for information leaking in corporate networks through the used of static analysis taint tracking. In Malicious and Unwanted Software (MALWARE), 2012 7th International Conference on, pp. 135-143. IEEE, 2012.

* cited by examiner

Private Contacts
Personal1
123456789
gcd@xx.com
Personal2
987456321
pwd2@sina.com
Personal3
654987321
kjhgf@yy.com
Personal0
321456987
a@fg.com
Personal4
653214789
ghjkfd@aaa.com ☐ Show Invisible Contacts (Only)

Add Account

FIGURE 6C

| Business Contacts |
| --- |
| business1 |
| 45677436 |
| guys@as.com |
| business |
| 246778743578 |
| ghjks@163.com |
| business2 |
| 632246799 |
| fjfafh@126.com |
| tom |
| 123467890 |
| dgjkf@sina.com.cn |
| |
| ☐ Show Invisible Contacts (Only) |
| Add Account |

FIGURE 6D

SYSTEM AND METHOD FOR PROXY-BASED DATA ACCESS MECHANISM IN ENTERPRISE MOBILITY MANAGEMENT

CROSS-REFERENCE TO RELATED APPLICATIONS

This patent application claims the benefit of U.S. Provisional Patent Application No. 62/218,072, filed on Sep. 14, 2015, the entire contents of which is incorporated by reference in its entirety.

BACKGROUND

The notion of bring your own device (BYOD) can refer to permitting employees to bring personally owned mobile devices, e.g., laptops, tablets, and smart phones, to their workplace, and to use those devices to access privileged company information and applications. The phenomenon is commonly referred to as IT consumerization. Additionally, businesses may be unable to stop employees from brining personal devices into the workplace, whether permitted or not. The term is also used to describe the same practice applied to students using personally owned devices in education settings.

BRIEF DESCRIPTION OF DRAWINGS

FIGS. 6A-D are screenshots of example multi-entity management, RBAC and content provider isolation.

DESCRIPTION

Employees tend to utilize personal devices to access corporation's resource given the popularity of bring your own device (BYOD). Device utilization for both business and personal purposes can create new security threats. For example, the privileged data need to be isolated from personal applications, e.g., as required by Enterprise Mobility Management (EMM), and users largely benefit from corporate data sharing across business applications regarding the usability. Android™, a mobile operating system (OS) with a dominant market share, lacks trustworthiness in the scenario of EMM, due to the numerous malicious applications and the absence of centralized application regulation. Existing solutions can have limitations, such as dependencies/modifications on OS, heavy developer support, and high performance penalty.

A system and method are described that can flexibly and dynamically grant a selective set of applications the permission of operating on privileged data via file system and content provider. The system and method can include (1) an application rewriting framework that builds EMM features into general Android™ application and captures the high-level stealthy data operations by hooking the low-level Linux system calls, and (2) a proxy-based data access mechanism for the policy enforcement with cross-platform property. The rewriting may introduce little performance penalty, and small increments on memory consumption and code size.

Figure 1:
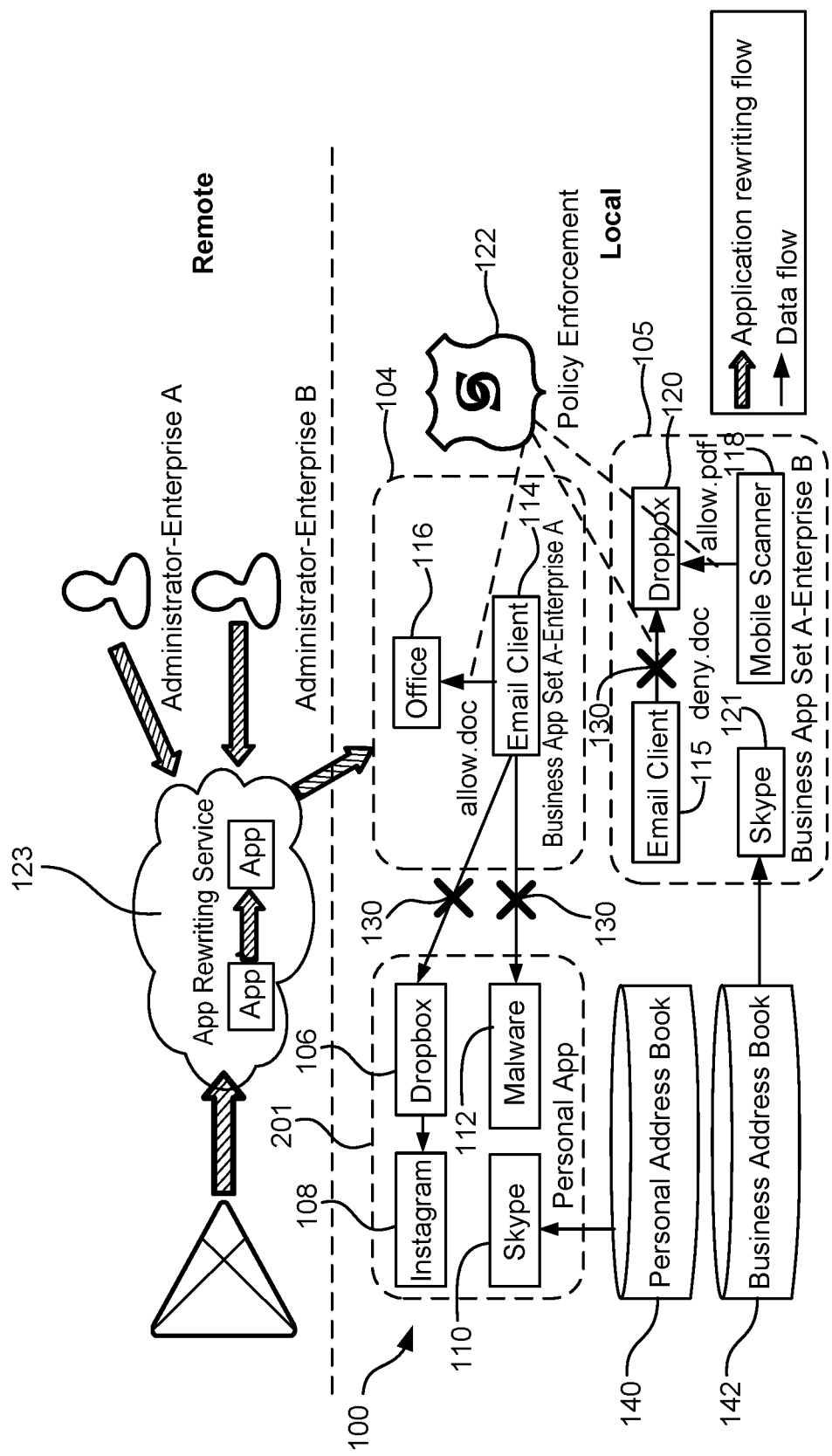
FIG. 1 is a block diagram of an example security model.

FIG. 1 is a block diagram of an example security model. A mobile device 100 may install both personal application 102 and business applications 104, 105, e.g., of different business enterprises A, B, etc. The mobile device 100, can include a mobile phone, a personal digital assistant, a tablet, a laptop computer, etc. A personal application may be any application that a user wishes to install, including possible malicious applications. Personal applications 102 include one or more of Dropbox™ 106, or other data sharing application, Instagram™ 108, or other photo sharing application, Skype™ 110, or other video conferencing application, and a malware application 112, etc. The business applications 104, 105 are typically issued by an information technology (IT) administrator of enterprise A, enterprise B, etc. Business applications 104 can include one or more of an email client 114, MS Office™ 116, or other operating system, etc. Business applications 105 can include one or more of an email client 115, mobile scanner 118, Dropbox™ 120, Skype™ 121, etc. The business applications 104, 105 can include off-the-shelf applications that are useful for the enterprise and vetted using existing malware detection systems. A shield application 122 is executed, for example in the cloud 123, to convert the off-the-shelf applications into business applications 104 that are shielded. Additionally or alternatively, the personal applications 102 can be re-written to include the shield application 122 The personal applications 102 can access storage device 140, e.g., which stores information including a personal address book, and the business applications 142 can access storage device 142, e.g., which stores information including a business address book.

The personal applications 102 can share data by existing mechanisms, such as a content provider and public external storage, on Android™. For example, Instagram™ 108 can post the photos managed by Dropbox™ 106. Business applications 104, 105 share corporate data using the mechanisms provided by the shield application 122. As described in more detail below, the shield application 122 manages a secure space where the business data is maintained. The shield application 122 can provide a hardened version of the business applications 104 with security features injected to apply the proxy-based data access mechanism, where the privileged data can be shared across business applications 104 and isolated 130 from the personal applications 102. When MS Office™ 116, for example, opens a document attachment from the business email client 114, the code injected into the application by the shield application 122 during rewriting validates the identity of MS Office™ 116, opens the attachment file, and provides the business version of MS Office™ 116 with the file descriptor of the opened file, but not the personal version of MS Office™ 110.

Shield application 122 manages a secure space where all the business data are maintained and security policies can be dynamically configured and enforced at file-level granularity as the tuple:

$$\text{Policy}=(\text{App } S, \text{Obj}, \text{App } R, D), \quad \text{(Equation 1)}$$

where App S and App R are the apps to share and receive the data, Obj is the ob-ject to be shared, and D is the decision made. When the MS Office 116 application, for example, opens a document "allow.doc" from the business Email Client 114, the shield application 122 validates the identity of the MS Office 116 application, verifies against the security policy, opens the attachment file, and provides the business version of MS Office 116 with the file descriptor of the opened file. Whereas the application Dropbox™ 120 cannot access the file "deny.doc" owned by Email Client 115 due to the policy violation. Existing Android™ storage can only either isolate the privileged data by setting them as privately accessible by one application or share the data via the system readable/writeable external storage. Conversely, the shield application 122 can provide flexible and dynamic enterprise data access control. The shield application 122 can grant a selective set of business applications the access permission to a set of enterprise data, which can be configured in real-time manner dynamically.

Mobile application management (MAM) is a series of software and services, which control the access to the corporation's proprietary resource in the level of application. Three types of MAM solutions for BYOD include application rewriting, software development kits (SDK), and OS modification. But as described in more detail below, the shield application 122 can be portable without the need for any modification/dependencies on the OS, unlike typical MAM solutions. The shield application 122 can inject MAM features by hooking low-level Linux system calls and rewriting bytecode and manifest files. The shield application 122 can be deployed across all versions of Android™ OS and all types of devices. The shield application 122 can provide a low performance penalty, unlike virtualization-based methods that are not suitable to the mobile platform with limited computing resource. The shield application 122 utilizes the application rewriting method with low resource consumption where only one OS instance is running. Additionally, the shield application 122 can provide complete mediation. The shield application 122 can enforce security policies by interposing on the low-level Linux system calls. Therefore, the high-level stealthy channels for accessing data can be monitored and controlled, such as Java reflection, dynamic loading, and native code, etc. Unlike MAM, the shield application 122 also requires no developer support. Unlike SDK-based methods, a developer does not spend any extra efforts in producing the business version of the application. The shield application 122 rewriting framework can automatically generate and deploy the hardened version of the business application 104.

Figure 5:
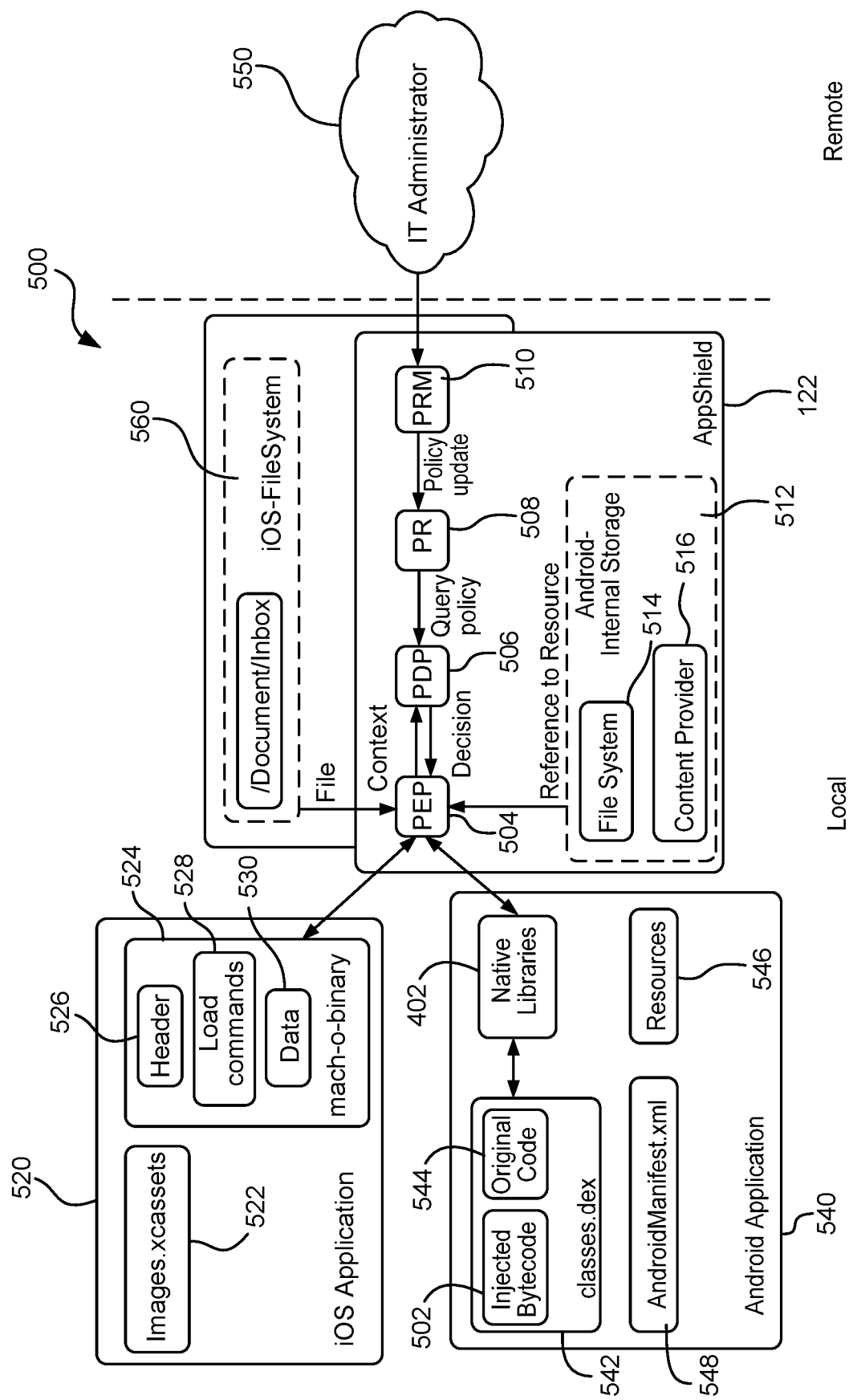
FIG. 5 is a block diagram of an example proxy-based data access mechanism.

As for multi-entity management, business applications from different companies installed on a device can be classified into various logic sets by the IT administrator 550 (FIG. 5). Given the flexibility and simplicity of management, role-based access control (RBAC) can be introduced to model the capabilities assigned to the user through the user-role review phase. In FIG. 1, the business application set A represents that a user is assigned the role holding the permissions to check the email and edit attached enterprise document belonging to enterprise A. The business application set B grants higher privilege to the user and allows the access to the address book storage device 142 and scanned document shared via the cloud service of enterprise B.

Figure 2:
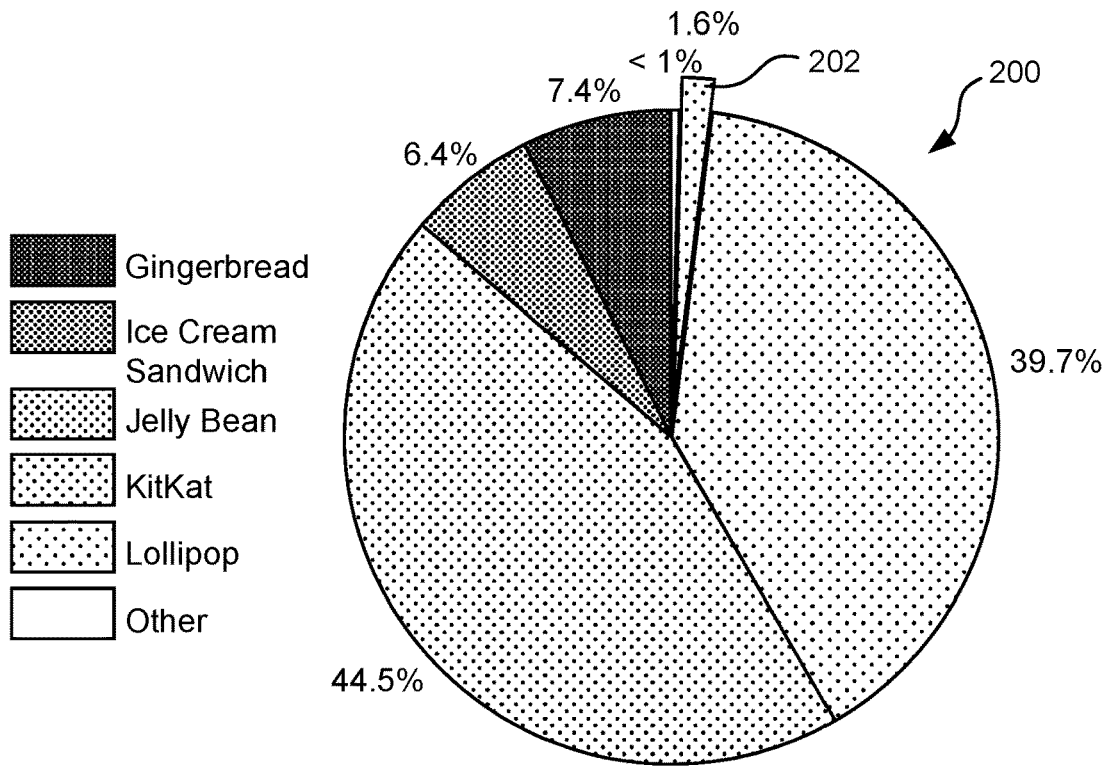
FIG. 2 is a pie chart of an example distribution of Android™ platform versions.

FIG. 2 is a pie chart of an example distribution 200 of Android™ platform versions. The accumulated market share of Android™ Lollipop 202 has only been 1.6% since its release in November, 2014. Android™ is the most dominant smartphone OS partly due to its open ecosystem. However, the open platform and markets also make it easier to disseminate malware applications 112 or otherwise untrustworthy applications. Android™ applications can frequently transmit private data to unknown destinations without user consent. Used in an enterprise environment, the malware applications 112 can threaten the confidentiality and integrity of business data intentionally or unintentionally. Android™ employs discretionary access control from the Linux kernel to isolate data between applications. External storage however traditionally does not provide such isolation and is more for sharing data. However, this is insufficient for BYOD. A solution for BYOD can preferably be: (1) Secure in that personal applications cannot access the data of business applications irrespective of the discretionary controls exercised by business applications; and (2) Usable in that business applications can share data among themselves. Encrypting data on the external storage might protect confidentiality but does not prevent malicious personal applications from modifying or deleting data of business applications.

Figure 3:
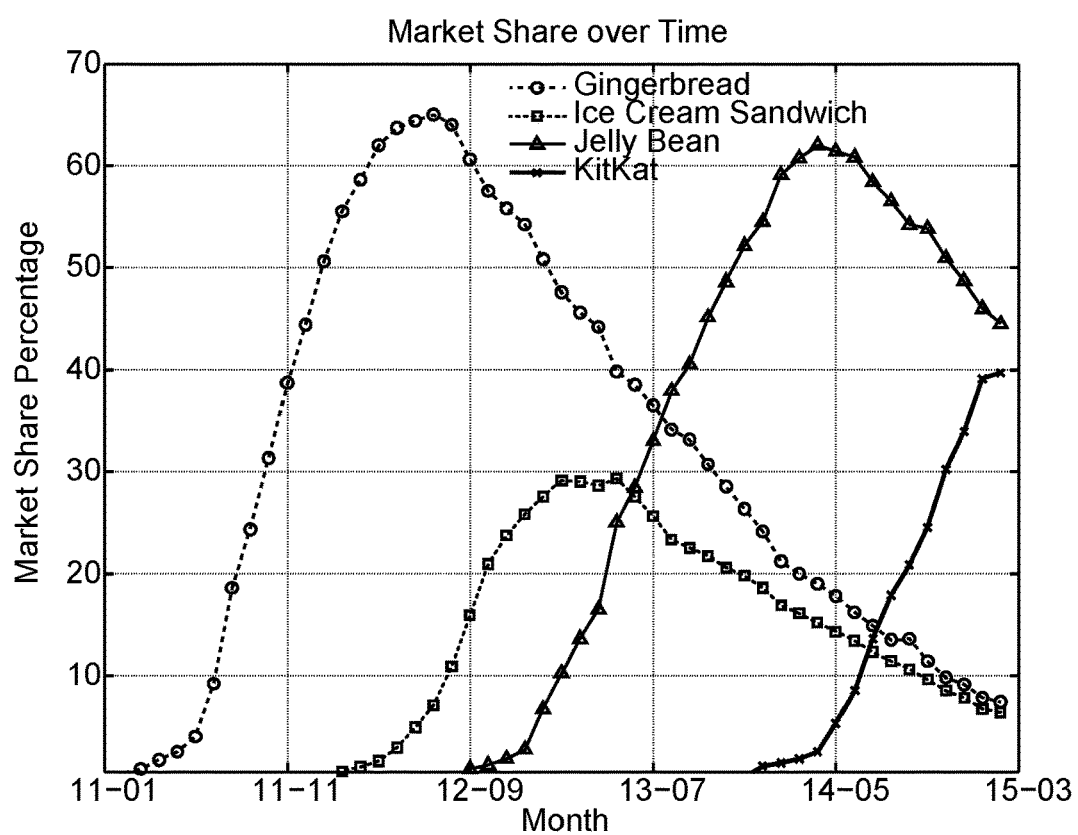
FIG. 3 is a graph of an example Android™ OS market share over time.

FIG. 3 is a graph of an example Android™ OS market share 300 over time. By analyzing the temporal market share of four popular Android™ OS versions: Gingerbread, Ice Cream Sandwich, Jelly Bean, and KitKat, it took a version of OS one to two years to achieve the maximal market share, and even Gingerbread with the maximal historic market share can only benefit 65 percent of devices with its features. Because the shield application 122 does not modify or depend on the OS, the shield application 122 is advantageous over OS based systems.

The existing Android™ storage mechanism can only support either data isolation by private internal storage or data sharing by the system-wide read-/writable external storage or by content providers. Some applications, such as TrustDroid, need modify the middleware and kernel to achieve the domain-level data isolation, which strongly reduces the portability. The shield application 122 can enable allocating a selective set of applications the privileged data access permission without OS modification and root privilege. Developers can utilize a diverse set of ways to access privileged data, such as content provider, file sharing in Java level, and file-related system calls at the native level. The shield application 122 can abstract the data access behavior to completely enforce the data isolation/sharing policies. The validation of application identity in enforcing data isolation/sharing policies introduces extra latency. Some previous studies employ virtualization-based approaches to provide isolation between private and corporate domains. Such applications do not scale well on resource-constrained mobile device. Moreover, deep virtualization largely reduces the battery lifetime due to the duplication of the complete OS. The shield application 122 utilizes a proxy-based approach described below to be lightweight, scalable, and practical.

Figure 4:
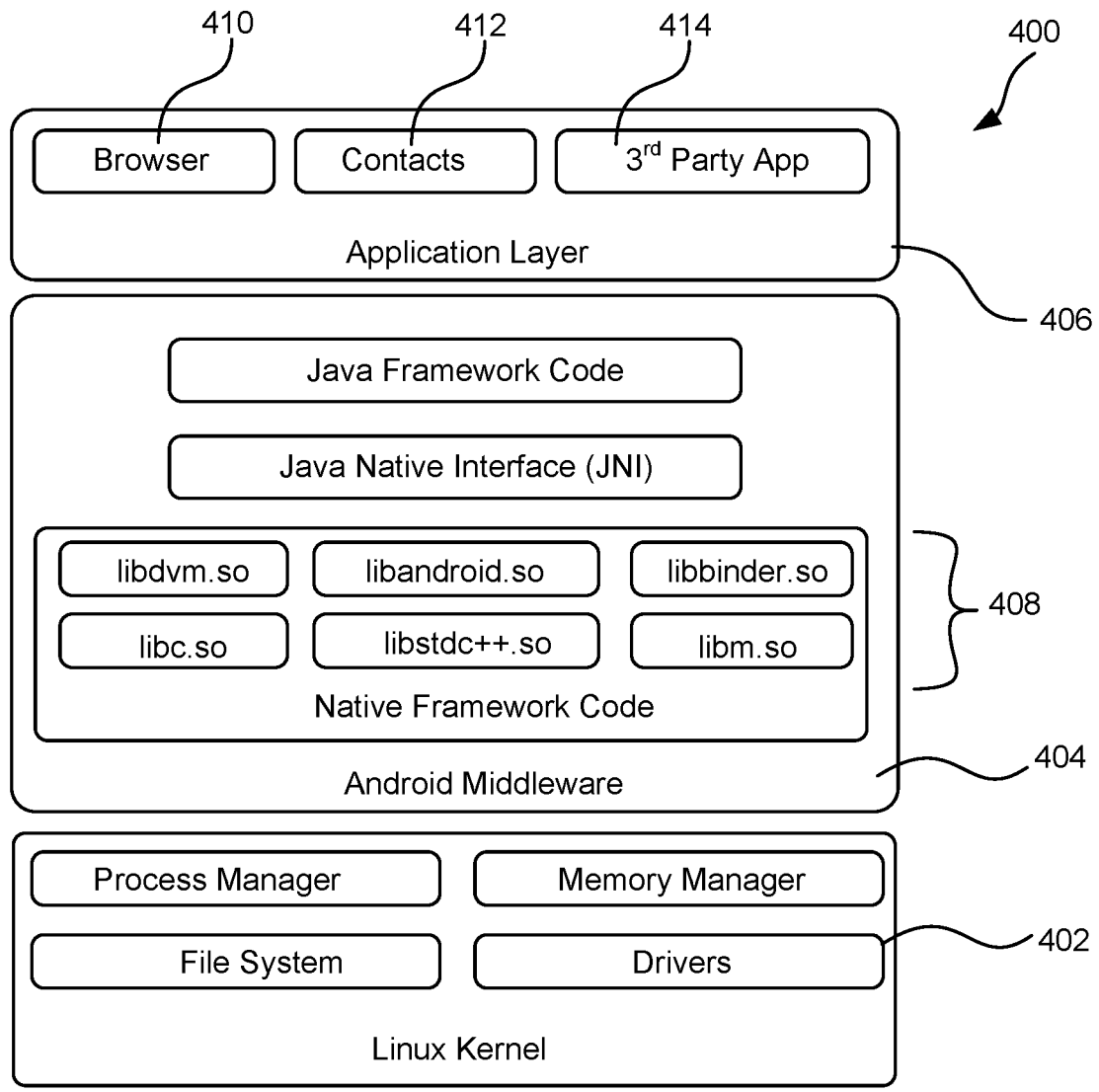
FIG. 4 is a block diagram of an example Android™ architecture.

FIG. 4 is a block diagram of an example Android™ architecture 400. The Android™ architecture 400 can include the Linux kernel 402, the Android™ middleware 404, and an application layer 406. The Linux kernel 402 provides the low-level functionalities, such as process manager and file system. The Android™ middleware level 404 includes the Android™ runtime environment and the native libraries 408. The Android™ runtime environment includes the register-based Dalvik Virtual Machine (DVM) and Java core libraries. The framework code in the native libraries 408 are designed to invoke the system calls in the kernel 402 and complete the required operation. Above the middleware 404 is the application layer 406, which has a set of system applications, e.g., Browser 410 and third party applications 414 installed from Android™ mobile markets. The application layer 406 can also include contact 412.

Android™ applications are implemented in Java, which is compiled down to Dalvik bytecode. It is also possible to use native code in applications. The Android™ runtime environment enforces the sandbox mechanism to separate running applications. An Android™ application is assigned a unique user identifier (UID), by which the Linux kernel enforces discretionary access control (DAC) on low-level resources. The middleware 408 further offers a permission system for fine-grained access control. An application is granted permissions during installation. Apart from the pre-defined permissions guarding the system services, applications can define customized permissions to restrict the access to their own components: Activities, Services, Content Providers, and Broadcast Receivers. Android™ includes content providers to control the access to a structured set of data. A content provider is identified by URI and organized as a SQLite database with schema and table definition. The data operations on content providers are merged to the low-level system call ioctl( ).

An Android™ developer can either call the OS API based on the framework library interface written in Java or directly invoke the native libraries 408. All the OS-level API invocations ultimately go though libc, which then makes system calls into the kernel. This is true for all file system accesses as well as inter process communication through, for example, the binder interface. Binders are an Android™-specific primitive for inter process communication. The libc layer provides the shield application 122 a reliable point that can abstract all the complex high-level privileged data access requests, e.g., for applying a proxy-based data access mechanism.

The libc is provided as a shared object, which is dynamic linked to reduce the memory consumption and to avoid code duplication. Each shared object keeps a file in Executable and Linkable Format (ELF) that maps a process's address space to the real addresses of functions to be executed. Given a shared object linked against with its ELF file, the call sites of the shared object jump to the stub functions in the ELF file's procedure linkage table (PLT), which loads the entry in the global offset table (GOT) and retrieves the address of the target function call. Therefore, the shield application 122 can inject hooks to monitor the application's data access behavior and enforce our security policies by overwriting the entries in GOT when the ELF file is loaded.

Android™ applications are distributed in APK, which is a JAR archive including compiled Java source files in Dalvik bytecode, compiled manifest file AndroidManifest.xml, compiled resources such as layout, images, and native libraries 402. The shield application 122 unpacks the APK file and decompile the dex bytecode to a custom intermediate representation (IR) smali file to enable our modification on the bytecode. The rewriting mechanism modifies the following parts of the target application. Native code is modified to implement customized system call hooks in C/C++ to monitor the privacy-sensitive behavior, such as open( ) and rename( ) for file access and ioctl( ) for data exchange via content provider. Java code cannot modify process memory space, so we include the native code to overwrite the GOT with the address of our detour hooks whenever any ELF file is loaded.

The Manifest file can also be modified. The Android™ OS has the process zygote to initialize all the applications. When an application is running, its runtime environment is established and fixed in the DVM. To enable overwriting the GOT in ELF file, the shield application 122 modifies the Manifest file of Android™ application to wrap the target application with our preprocess service. Specifically, the shield application 122 injects a service into the application that invokes the native code to modify the GOTs of all the loaded ELFs, and the preprocess service is configured as the parent class of the whole target application to guarantee it is running in the middle of zygote initialization and the start of the application. Moreover, the shield application 122 front-end application manages the security policy repository set by the IT administrator 550 and enforces the security policies that grant the application access to privileged data. Therefore, the shield application 122 declares the Services and Activities in the manifest file, which are injected into the target application's bytecode to communicate with the shield application 122 and popup user interface (UI) message about the violation of secure policies. Regarding the data sharing/isolation of content provider, the shield application 122 creates a mirror content provider in the private internal storage of the shield application 122 and guards it with a special permission. Therefore, if a business application 104 needs access to this content provider, it must declare this permission in the Manifest file.

The bytecode can also be modified to configure the preprocess service as the parent class of the top application. For example, class A is the child class of class B whose parent class is android.app.Application. Then the shield application 122 replaces the parent class of class B with the injected service. The Services and Activities handling the communication with the shield application 122 and showing UI message are written in Java, compiled to .class files, and converted to Dalvik bytecode. The shield application 122 can then compile the IR into the rewritten version of dex bytecode and repack the application into an APK file. An application needs to be signed, but rewriting invalidates its original signature, and the shield application 122 cannot sign the rewritten application using its original private key. The signature is mainly used for identifying the developer. The shield application 122 can achieve this function by signing apps originally signed with same keys with same, but new, keys.

The shield application can be deployed as a remote service and generates a random private key to sign each business application. When the application is installed, the client side shield application 122 keeps the mapping from the application name to the signature, which is used to differentiate business applications 104 and personal applications 102. Due to the physical isolation of signature generation and the one-to-one mapping of original keys to new keys, it is computationally difficult for an attacker to create a malicious application with the same signature as that of a legitimate business application to launch the privilege escalation attack. The remote service can manage application update in the same way as mobile marketplaces. Moreover, the security model can consider only user applications, not system applications.

FIG. 5 is a block diagram of an example proxy-based data access mechanism 500. The example includes an iOS application 520, including images 522 and a Mach object 524, including header 526, load commands 528 and data 530, and an Android™ application 540, including a Dalvik executable file 542, with original code 544 and injected Bytecode 502, resources 546, AndroidManifes 548 and native libraries 402. An operation on privileged data via a file system and a content provider go through the shield application 122 low-level system calls. The injected bytecode 502 collects the context of operation during the system call, such as the application name, application signature, and properties of the data. The context is then sent to the Policy Enforcement Point (PEP) 504, which is implemented as a service in the shield application 122 and can be accessed by other applications through a Unix domain socket. The Policy Decision Point (PDP) 506 decides whether the operation on the target data is allowed based on the context from PEP 504 and the query results from the Policy Repository (PR) 508 that can be remotely updated by IT administrator 550 through Remote Policy Manager (RPM) 510.

The shield application 122 can virtually maintain a file system and content providers in its internal storage 512. If data sharing is allowed, the shield application 122 generates a reference to the data and provides the business application 104 a file descriptor and cursor. The business application indirectly operates on the privileged data based on the reference to avoid creating duplicated data for the sake of performance, security, and synchronization. Because the file system 514 and content provider 516 are privately stored in the internal storage 512 and PDP 506 validates if the request is from a business application 104, data isolation is achieved.

The shield application 122 redirects the file operations from business applications 104 to its own internal storage 512. Regarding the proxy-based data access mechanism on file-system level, the shield application 122 can hook the following system calls. The shield application 122 can hook the open( ) system call. When a rewritten application invokes this system call, the shield application 122 calls the original system call open( ) with a modified file path in the internal storage of the shield application 122 and passes the flags and modes. The shield application 122 can hook creat( ), rename( ), mkdir( ), remove( ). The shield application 122 replaces the file paths in the parameters of these system calls with the corresponding business file paths in its internal storage. The shield application 122 can hook stat( ), lstat( ). The shield application 122 first gets a file descriptor to the corresponding business file in its internal storage and then invokes the fstat( ) to fetch the file status.

Android™ includes content providers to manage access to a structured set of data. Data in content provider are identified by uniform resource identifier (URI). The proxy-based data access mechanism on content provider can create mirror content provider and hook system call ioctl( ). To create mirror content provider, the core of content provider is a SQLite database. The shield application 122 duplicates the target content provider with the same schema and table definition in its private internal storage. The shield application 122 guards the mirror content provider with a special permission. With regard to the hook system call ioctl( ), access to content provider relies on IPC. This is the main system call through which all binder IPCs are sent. By interposing on this system call, the shield application 122 replaces the URIs to the original content provider with the URIs to the mirror content provider to redirect the data operation. Using context in this system call, the shield application 122 can validate who initiates the operations on the content provider, and the PDP 506 can decide whether to allow the access. Malware 112 or other malicious application thus cannot operate on the mirror content provider by the overwriting URI and permission declaration.

In one implementation, the shield application 122 leverages the existing open source tools smali/baksmali and apktool to unpack, decompile, and repack the application. The shield application 122 implements customized system calls in C/C++. With the help of open source tool AXML, the shield application 122 can modify the Manifest file at ease. The services and activities used to communicate with the shield application 122 and popup warning message can be implemented in Java and those .class files are converted to bytecode using dx included in Android™ build tools. The shield application 122 can also implement a script in Python to rewrite the bytecode in IR.

Android™ has three system content providers: contact provider, SMS provider, and calendar provider. The proxy-based data access mechanism can be implemented on the contact provider. The calendar provider and SMS provider can be easily extended to other content providers. For the content providers of third-party applications, the shield application 122 interposes on the system call ioctl( ) and disallow the operation when the application managing the content provider and the application accessing the data are from different sets.

Given the closed source iOS, it can be hard to have the rewriting framework inject the MAM features into general iOS applications without developer support. However, the proxy-based data access mechanism can be easily extended on iOS platform. The shield application 122 manages the virtual file system 560 in its private space. The business applications can create and update the privileged file by sending it to the shield application 122 directory Documents/Inbox/. When an application attempts to read the privileged data, the shield application 122 enforces the security policies by checking if the application is in the business set before the file is actually sent. The shield application 508 can record the mapping between the application's identity and the file object, which is expressed as App S and Obj in Equation 1. The "Open-in management" feature, introduced from iOS 7, allows the shield application 122 to control which application the device uses to open a file. When an application App R attempts to operate on the privileged file, the shield application 122 validates the request against the policies in PR 508.

The following table is an example runtime latency introduced by shield application 122.

|  | File System | | | | Content Provider | |
| --- | --- | --- | --- | --- | --- | --- |
|  | Android TM | | iOS | | Android TM | |
|  | Original | Shield App | Original | Shield App | Original | Shield App |
| Micro-benchmark × 1000 (s) | 0.180 | 0.382 | 0.171 | 0.347 | 7.303 | 9.014 |
| Macro-benchmark (s) | 1.472 | 1.524 | 1.643 | 1.753 | 1.068 | 1.194 |

The Table is based on an example stress test with intensive 1000 data access operations to investigate the latency introduced by the shield application 122. First, accumulated time spent on getting the file descriptor on Android™ and rendering the file contents on the iOS UI is recorded with and without security policies enforced, respectively. The time of fully opening and loading file contents into the UI is measured on that platform. The total time of fetching the cursor is measured, which is a reference to the content provider. The results are listed in the Table. In the worst case, the shield application 122 policy enforcement introduced a latency of 2.269 ms on the Android™ file system, because acquiring each file descriptor involves one round of IPC with the shield application 122. As for rendering the file contents on the UI on iOS, the shield application 122 can introduce a latency of 176 ms. The shield application 122 introduces a latency of 1.711 when getting the cursor of content provider. Since IPC is the dominant factor in the latency and has a fixed time cost, the relative latency decreases as the original file system operation takes longer.

To evaluate the perceived latency of our proxy-based data access mechanism, a user can manually load data via the file system and content provider on the smartphone. The time is recorded from when the user started to access the data until when she closed the application after the data was fully rendered on screen. The user performs a series of data access operations for five times with and without the shield application 122. The table shows the average of time. The shield application 122 can introduce a latency of 52 ms, 110 ms, and 126 ms in data operations on the Android™ file system, iOS file system, and Android™ content provider, respectively. Such latency can be barely perceptible.

FIGS. 6A-D are screenshots of example multi-entity management, RBAC and content provider isolation. In some examples, the file-related operations from personal applications 102 to business applications 104, 105 are strictly prohibited. All the files owned by business applications 104, 105 are kept in the internal storage of shield application 122 client application, which is invisible to all the other applications. When an application initializes the file operation request, the package name bound with its signature are sent to the shield application 122, which verifies whether it is a business application against the record in a database. It can be very challenging to evade this security check because it requires the attacker to get the mapping relation between package name to application signature, which is constructed on the remote server side and securely stored in the private space of shield application 122 client side.

Figure 6A:
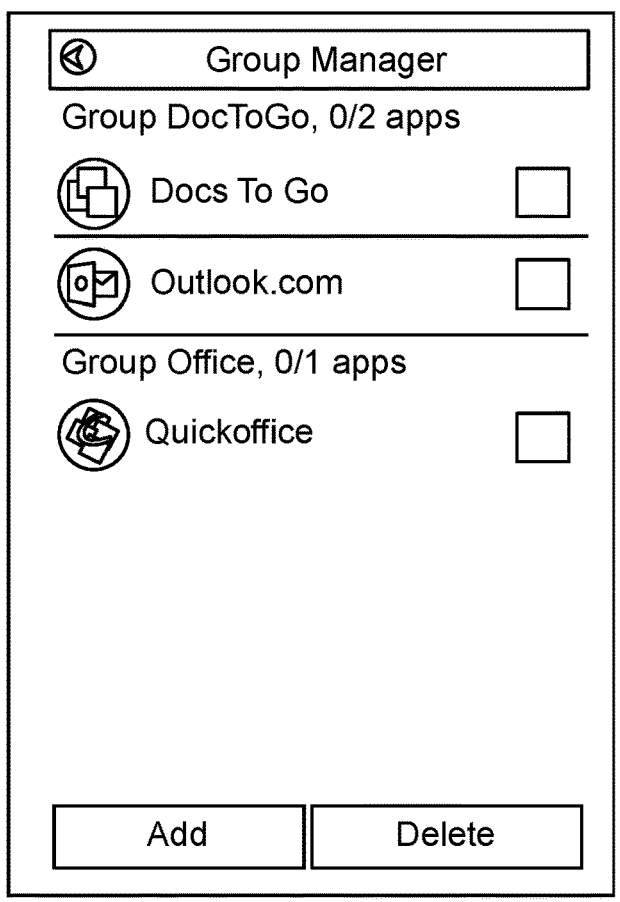
Figure 6B:
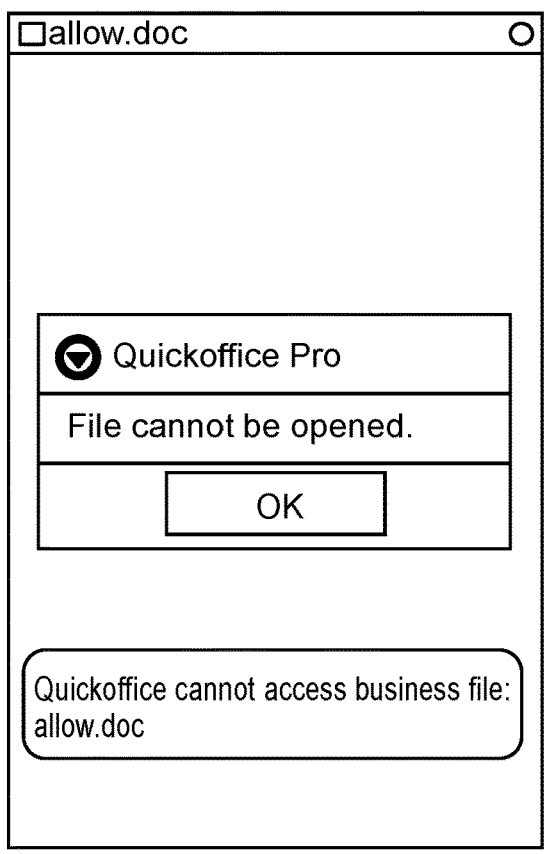

Given the business applications 104, 105 from different companies, IT administrators 550 can set up multiple application sets, where the union of the application sets functionalities represents the permissions granted to this role (set). After a business application 104, 105 is pushed and installed on the device, it is assigned to a business application set following the configuration made by IT administrators 550, which can be dynamically adjusted on-the-fly. Once the business identity of the application requesting file access App R is verified, the shield application 122 can further check whether there is an application set including both the owner of the target file App S and App R. If the two applications are not grouped into the same set, the file operation is denied, which guarantees the orthogonal data access among roles. The example is illustrated in FIG. 6A and FIG. 6B, where one application set includes email client Outlook™, document editor Docs to Go™, and another set includes the application Quickoffice™. When Quickoffice™ tries to open the file allow.doc as an attachment in Outlook™, the request is denied because the policy maintains the parallel access among different roles.

Fine-grained file access control Android™ Lollipop allows all the requests across the business applications. In contrast, the shield application 122 file sharing is managed at file-level granularity for the applications in the same set. Given the sender app App S, the receiver app App R, and the file object Obj, the shield application 122 checks the corresponding security policy in its repository, whose default value is Allow. This mechanism enables more flexible access control in protecting the high confidential file.

A content provider isolation business application can conduct operations on the mirror content provider. If the applications identity is verified, the cursor of the mirror content provider is returned, or the shield application 122 assigns the application with the reference to the system content provider. This guarantees the isolated operation on data in system default content provider and business privileged content provider. Note the example application in FIG. 6C and FIG. 6D, with the behavior of accessing the system's address book, the enterprise application fetches the business contacts in mirror content provider.

Figure 7:
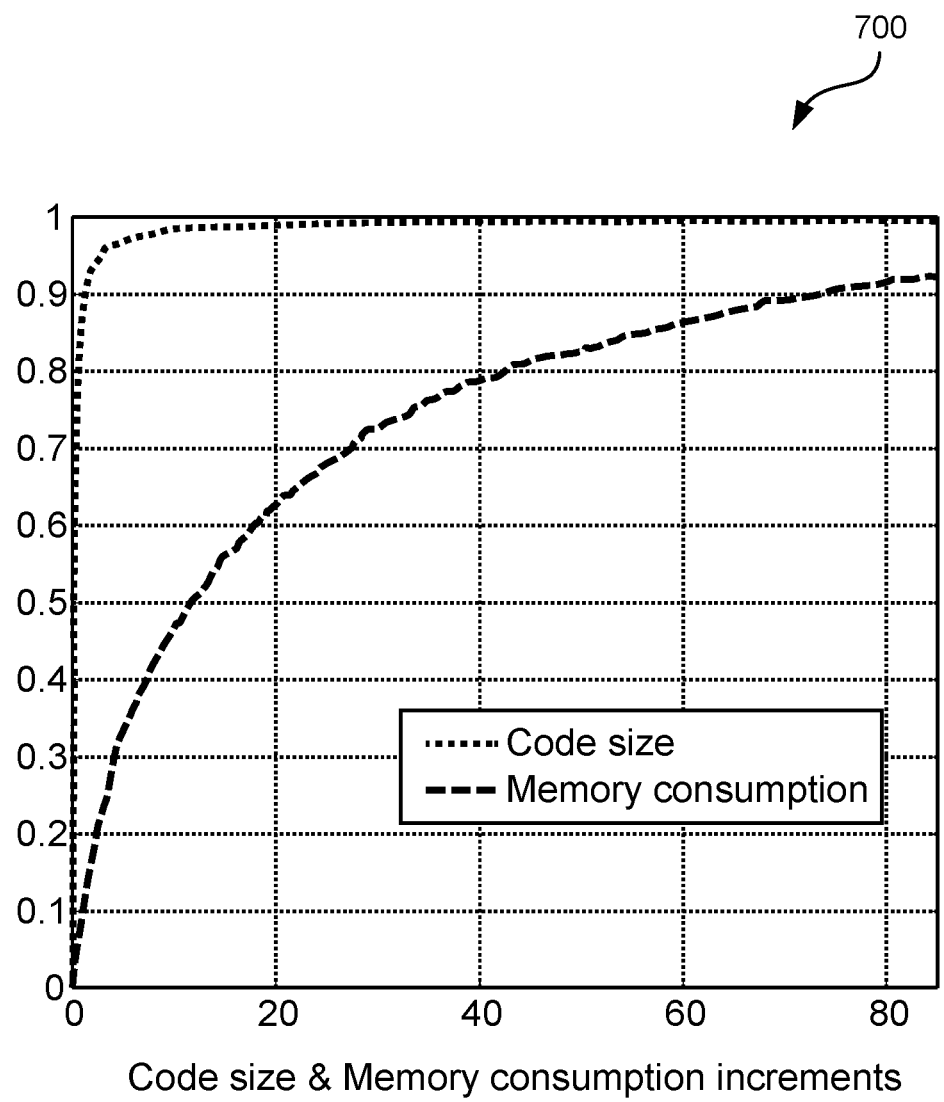
FIG. 7 is a graph of an example memory usage and code size overhead introduced by application rewriting.

FIG. 7 is a graph of an example memory usage and code size overhead 700 introduced by application rewriting. An example cumulative distribution function (CDF) is shown of the overhead in memory usage and code size caused by rewriting. To eliminate the side-effect of Android™ garbage collection when calculating memory usage, the tool dumpsys in Android™ Debug Bridge (adb) can be used to get the maximal memory usage during the execution of an application. To eliminate the side-effect of compression during application packing, when calculating code size, the customized native libraries, Android™ Manifest file, and Dalvik bytecode are summed.

The shield application 122 rewriting may introduce less than 5% code size increment in over 95% applications, and more than 85% applications may incur the memory usage overhead less than 60%. The average overhead can include 28840.3KiB in memory usage and 33.7KiB in code size. The shield application 122 can hooks into the low-level system calls, and the dynamic linking naturally supports the efficient memory utilization by avoiding code duplication. Moreover, the shield application 122 can add customized system calls, and the classes for UI notification just once rather than inlining them at every point where the original application accesses privileged data.

Therefore, in an exemplary implementation, the shield application 122 can achieve privileged data isolation/sharing by proxy-based data access mechanism and application rewriting framework. The shield application 122 only modifies the business application itself, and is independent on the OS version or requires no root privilege. These advantages make the shield application 122 portable in the current heavily segmented Android™ or other ecosystem. The shield application 122 enforces security policies by interposing on low-level Linux system calls, which abstracts complex high-level data access behavior and covers stealthy channels. The proxy-based data access mechanism can also be used with other platforms.

Figure 8:
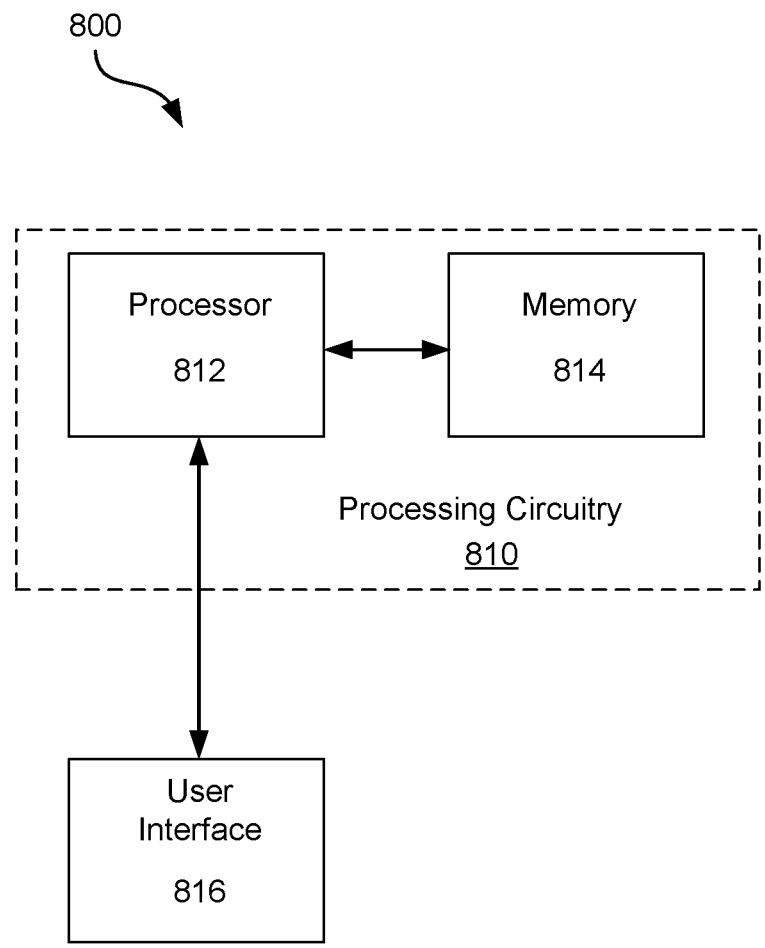
FIG. 8 is a block diagram of an example computing system.

FIG. 8 is a block diagram of an example computing device 800. The systems and methods described above may be implemented in many different ways in many different combinations of hardware, software firmware, or any combination thereof. In one example, the computing device 800 may enable the shield application 122. It will be appreciated that the components, devices or elements illustrated in and described with respect to FIG. 8 below may not be mandatory and thus some may be omitted in certain embodiments. Additionally, some embodiments may include further or different components, devices or elements beyond those illustrated in and described with respect to FIG. 8.

In some example embodiments, the computing device 800 may include processing circuitry 810 that is configurable to perform actions in accordance with one or more example embodiments disclosed herein. In this regard, the processing circuitry 810 may be configured to perform and/or control performance of one or more functionalities of the shield application 122. The processing circuitry 810 may be configured to perform data processing, application execution and/or other processing and management services according to one or more example embodiments. In some embodiments, the computing device 800 or a portion(s) or component(s) thereof, such as the processing circuitry 810, may include one or more chipsets and/or other components that may be provided by integrated circuits.

In some example embodiments, the processing circuitry 810 may include a processor 812 and, in some embodiments, such as that illustrated in FIG. 8, may further include memory 814. The processor 812 may be embodied in a variety of forms. For example, the processor 812 may be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 812 may comprise a plurality of processors. The plurality of processors may be in operative communication with each other and may be collectively configured to perform one or more functionalities of the computing device 800 as described herein. In some example embodiments, the processor 812 may be configured to execute instructions that may be stored in the memory 814 or that may be otherwise accessible to the processor 812. As such, whether configured by hardware or by a combination of hardware and software, the processor 812 is capable of performing operations according to various embodiments while configured accordingly.

In some example embodiments, the memory 814 may include one or more memory devices. Memory 814 may include fixed and/or removable memory devices. In some embodiments, the memory 814 may provide a non-transitory computer-readable storage medium that may store computer program instructions that may be executed by the processor 812. In this regard, the memory 814 may be configured to store information, data, applications, instructions and/or the like for enabling the computing device 800 to carry out various functions in accordance with one or more example embodiments. In some embodiments, the memory 814 may be in communication with one or more of the processor 812, the user interface 816 for passing information among components of the computing device 800.

While various embodiments have been described, it can be apparent that many more embodiments and implementations are possible. Accordingly, the embodiments are not to be restricted.

We claim:

1. A system, comprising:
    a shield application executing by a processor in a mobile device, where the shield appliation converts a local business application into a shielded local business application, by modifying native code of a portion of an address table in the shielded local business application to include low-level operating system calls hooks, such that the shield application monitors data access behavior by redirecting system calls to a mapped portion of the address table of the shielded local business application which is stored within the shield application, where the shield application provides data isolation between the shielded local business application and personal applications, and data sharing between the shielded local business application and other local business applications.

2. The system of claim 1, where the shield application further enforces securities regarding proprietary data access management without operating system middleware modification, a virtual machine modification, or an operating system root privilege.

3. The system of claim 1, where the shield application is operable to rewrite any stock operating system application and produce a hardened version of the business application to enable fine-granulated control of a privileged data access behavior.

4. The system of claim 1, where the shield application is configured to enhance a trustworthiness of an Android device in a scenario of bring-your-own-device and enterprise mobility management.

5. The system of claim 1, where the shield application includes a policy enforcement point configured to implement a context of an operation of the shielded business application as a service in the shield application.

6. The system of claim 5, where the policy enforcement point is accessed by other business applications through a Unix domain socket.

7. The system of claim 5, where the shield application further includes a policy decision point connected with the policy enforcement point, the policy decision point being configured to decide whether the operation on a target data is allowed based on the context.

8. The system of claim 7, where the shield application further includes a policy repository connected with the policy decision point, where the policy decision point is configured to further decide whether the operation of the target data is allowed based on query results from the policy repository.

9. The system of claim 8, where the shield application further includes a remote policy manager connected with the policy repository, where the query results remotely updated by an administrator through the remote policy manager.

10. The system of claim 1, where the shield application virtually maintains a file system and content providers in an internal storage.

11. The system of claim 1, where the shield application is configured to generate a reference to a data and provides the business application a file descriptor and cursor if data sharing is allowed.

12. The system of claim 11, where the shielded business application indirectly operates on the data based on the reference to avoid creating duplicated data.

13. The system of claim 1, where the shield application redirects an operation from the business application to an internal storage of the shield application.

14. A method for rewriting application statically and providing enterprise data access control via interposing on low-level operating system calls, comprising:
    converting by a processor in a mobile device, local application code to an intermediate representation; and
    modifying by a locally executed shield application, a portion of native code of the local application to inject customized system calls by overwriting addresses of a portion of global offset table with the addresses of detour system calls;
    modifying by the locally executed shield application, a bytecode of the local application to initiate the communication between business applications of a mobile device and render security related information based on security policies to a user interface;
    injecting by the locally executed shield application, hooks into the low-level operating system calls to monitor data access by the local application and enforce the security policies through redirecting system calls to a mapped portion of global offset table of the local application which is stored within the locally executed shield application;
    modifying a manifest file of the application to declare required permissions and modules injected into bytecode; and converting back from the intermediate representation to an application that runs on stock operating system environments.

15. The method of claim 14, where the operating system comprises Android.

16. The method of claim 14, further comprising:
handling orthogonal data access by business applications and personal applications to file system level and content provider level.

17. The method of claim 14, further comprising:
providing a flexible and dynamic access control at a file-level granularity.

18. The method of claim 14, further comprising:
providing mediation to cover stealthy data access channels including native code execution, java reflection and dynamic loading.

* * * * *